3,766,230
AZOMETHINE COMPLEX PIGMENTS
Eric Richard Inman, Bridge of Weir, Ian Alexander Mac-
Pherson, Paisley, and John Andrew Stirling, Glasgow,
Scotland, assignors to Ciba-Geigy AG, Basel, Switzer-
land
No Drawing. Filed July 2, 1971, Ser. No. 159,457
Claims priority, application Great Britain, July 3, 1970,
32,308/70; Jan. 15, 1971, 2,024/71
Int. Cl. C07f 1/08
U.S. Cl. 260—438.1                                      12 Claims

ABSTRACT OF THE DISCLOSURE

Pigments of the formula

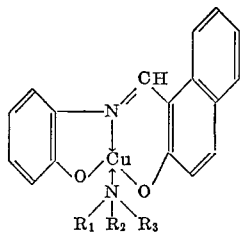

wherein $R_1$ and $R_2$ are the same or different and each is hydrogen or an alkyl radical having from 1 to 22 carbon atoms and $R_3$ is an alkyl radical having from 1 to 22 carbon atoms, the alkyl radicals in $R_1$, $R_2$ and $R_3$ being unsubstituted and uninterrupted or being terminated by an OH, $NH_2$ or CN group or being interrupted by an ethylenic or an oxygen-, sulphur- or nitrogen-containing group, are useful for coloring polymeric materials in fast yellow shades.

---

The present invention relates to azomethine copper complex compounds having valuable pigmentary properties, and in particular to azomethine colouring matters suitable for the pigmentation of paints, lacquers, printing inks, rubber, artificial polymeric materials, paper and textile materials and to processes of producing these azomethine substances.

According to our co-pending British application No. 26,502/69 (2(2-hydroxylatonaphth-1-ylmethyleneamino) phenolato copper$^{II}$ having the formula:

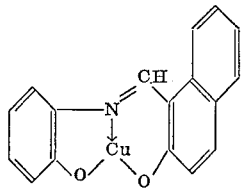

can be converted to an olive yellow pigment of good fastness to weathering when incorporated into surface coatings.

It is also known that Cu$^{II}$-O,O'-dihydroxydiarylazomethine complexes form solvent soluble derivatives with aromatic tertiary bases such as pyridine and quinoline.

Physical treatments, particularly of azo pigments with specified amines and their derivatives in order to produce dispersibility in printing ink, have been described and claimed in a number of patent specifications, for example, British patent specifications Nos. 925,901 and 1,080,-115; but these products are not described as being or containing the products of an addition reaction between the amine and the pigment.

We have now found that the compound of Formula I reacts chemically with certain long-chain alkyl amines to give discrete compounds which are substantially insoluble and which retain the excellent fastness properties of the parent compound. The new amine adducts of the invention differ structurally from the known amine Cu$^{II}$ complexes described hereinbefore as is shown by the respective X-ray diffraction and thermal breakdown behaviours and, moreover, the new amine adducts are superior to those already known in terms of colour value and are equally fast to acids and to weathering.

According to the present invention, there are provided pigments having the formula:

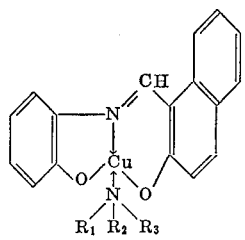

wherein $R_1$ and $R_2$ are the same or different and each is hydrogen or an alkyl radical having from 1 to 22 carbon atoms and $R_3$ is an alkyl radical having from 1 to 22 carbon atoms, the alkyl radicals in $R_1$, $R_2$ and $R_3$ being unsubstituted and uninterrupted or being terminated by an OH, $NH_2$ or CN group, or being interrupted by an ethylenic or an oxygen-, sulphur- or nitrogen-containing bridge.

In a preferred embodiment, $R_1$ and $R_2$ are hydrogen and $R_3$ is a straight-chain alkyl residue having from 16 to 22 carbon atoms. The oxygen-, sulphur- or nitrogen-containing bridge may be an —O—, —NH—, —S—, —CO—, —COO—, CONH— or —SO$_2$— bridge.

In one group of compounds falling within the definition of compounds of Formula II, $R_1$ is a C1–C22 alkyl group and $R_2$ and $R_3$ are each a cyanoethyl group.

The exact structure of the solid copper$^{II}$ complex of 2(2-hydroxynaphthyl-1-ylmethyleneamino)phenol of Formula I is not yet known. It is usually formulated as a dimer, as for example, by Holm, Everett and Chakravoty in "Progress in Inorganic Chemistry," 1966, 7, 156.9, mainly from a consideration of its magnetic properties and of the structure of the formally similar 4-o-hydroxyphenylamino-3-penten-2-one copper$^{II}$ as reported by Barclay, Harris, Hoskins and Kokot in the "Proceedings of the Chemical Society," 1961, p. 264. More recently, Ison and Kokot in the "Australian Journal of Chemistry," 1970, 23, 661–72, have suggested a tetrameric structure, again on the basis of magnetic properties.

For simplicity, we have formulated the compounds of the invention as being monomeric and as containing a coordinate covalent bond between the nitrogen of the amine and copper but it is to be understood that our invention is not limited by any particular interpretation of structure.

The present invention also provides a first process in which a compound of Formula II is produced comprising reacting, preferably at an ambient temperature below 60° C. a compound of Formula I as hereinbefore defined with at least an equimolar amount of an amine $NR_1R_2R_3$ wherein $R_1$, $R_2$ and $R_3$ each have their previous significance.

If the amine is a liquid, an excess of amine may be used as a reaction solvent; after reaction the excess amine may then be removed by washing with a suitable solvent and the solid product remaining may be dried, preferably at a temperature below 60° C. to avoid the risk of caking or decomposition.

If the amine is a solid, an extraneous solvent is preferably employed, suitably a low-boiling alcohol which may contain a proportion of water although any non-acidic solvent, for instance an aromatic hydrocarbon or halo- or nitro derivative, may be employed, provided that the amine is sufficiently soluble and the compound of Formula II is not dissolved by it.

The amine used may be of a pure or of a technical quality; or, if desired, on economic grounds or because of the precise properties of the pigment so produced, any mixture of the amines $NR_1R_2R_3$ as defined herein may be used.

Preferred amines for use in producing a compound of Formula II include monoethylamine, ethylene diamine, monoethanolamine, N'-aminoethylenethanolamine, tetradecyloxy-n-propylamine, hexadecyloxy-n-propylamine, octadecyloxy-n-propylamine; n-dodecylamine, n-hexadecylamine, n-octadecylamine, commercial stearylamine, n-docosanylamine, di-n-dodecylamine, N,N'-dicyanoethyl octadecylamine and N,N'-dicyanoethyl-docosanylamine.

In a less preferred embodiment, a compound of Formula II may be produced by metallising the hydroxynaphthyl-methyleneaminophenol ligand with the corresponding copper amine complex.

The present invention still further provides a method by which an organic material is coloured comprising intimately mixing the organic material with a minor proportion of a compound of Formula II; as well as the organic material when so coloured.

If desired, the colouration according to the invention may be carried out using a composition comprising the compound of Formula II and up to an equimolar proportion of the compound of Formula I, without affecting substantially the advantages conferred by the use of the compound of Formula II rather than previously known compounds.

The high molecular weight hydrophobic organic material or other organic material to be coloured according to the invention may be any polymeric or other organic material capable of being pigmented or otherwise coloured. The materials may be a natural or synthetic polymer or co-polymer, or a coating composition for application to the surface of an article. However, the process of the invention is applicable with particular advantage to the pigmentation of natural or synthetic polymers or co-polymers, in the form of fibres or bulk material; to paints; lacquers and other surface coating compositions, or to tinting compositions for use in preparing such coating compositions. Examples of polymers or co-polymers which may be pigmented by the process are thermosetting and thermoplastic acrylic compositions, alkyd melamine formaldehyde compositions and polyacrylonitriles.

The present invention provides derivatives of the compound of Formula I which can be used directly as pigments without a separate conditioning process and which at the same time possess increased strength compared with the conditioned parent complex. The products of the invention enable a greater variation of shade to be produced whilst they retain the outstanding fastness to weathering, resistance to acids, transparency and other properties which are a feature of the parent compound.

The present invention is further illustrated by the following examples. Parts and percentages shown therein are expressed by weight.

EXAMPLE 1

108 parts of 2(2 - hydroxylatonaphth - 1-ylmethyleneamino)phenolato copper$^{II}$ were suspended in 1582 parts of ethanol with stirring and a solution of 89.6 parts of technical stearylamine (Armeen 18D, Armour Hess Ltd.) dissolved in 1345 parts of hot ethanol was added. The mixture was stirred for 18 hours, filtered cold, washed with 396 parts of ethanol followed by 396 parts of methanol, and dried at 50° C. giving 183.5 parts of a golden brown powder containing 10.9% copper (theory 10.7%). A similar product was obtained by replacing the ethanol with an equal weight of isopropanol, commercial 87% aqueous isopropanol, or by nitrobenzene.

EXAMPLE 2

32.45 parts of 2(2-hydroxylatonaphth-1-ylmethyleneamino)phenolato copper$^{II}$ was stirred into 800 parts of methanol at room temperature and 24.1 parts of n-hexadecylamine in 800 parts of methanol were added. The mixture was stirred 2 hours, filtered cold, washed with 1600 parts of methanol and dried at 60° C. overnight to give 53.0 parts of a yellow solid containing 10.9% copper. $C_{33}H_{46}N_2O_2Cu$ requires 11.2% copper.

EXAMPLE 3

A cold solution of 43.1 parts of N,N'-dicyanoethyldocosanylamine in 600 parts of cold methanol was added to a well-stirred suspension of 32.4 parts of finely divided 2 - (2 - hydroxylatonaphth - 1 - ylmethyleneamino) phenolato copper$^{II}$ in 400 parts methanol and the resultant thick pale green suspension stirred for 2 hours at room temperature. The product was filtered off and washed with 1000 parts methanol before drying at 50° C. to give 73.0 parts of a pale green powder containing 8.7% copper. Theory for $C_{45}H_{64}O_2N_4Cu$ is 8.4% copper.

EXAMPLE 4

2.0 parts of 2(2-hydroxylatonaphth-1-ylmethyleneamino)phenolate copper$^{II}$ were added to 25 parts monoethylamine and the resultant suspension stirred at room temperature for 2 hours. The solid material was filtered off, washed with 50 parts methanol and dried at 50–55° C. to yield 2.0 parts of a dark green solid which contained 17.16% copper (theory for $C_{19}H_{18}O_2N_2Cu=17.23\%$).

EXAMPLE 5

32 parts of 2-(2-hydroxylatonaphth-1-ylmethyleneamino)phenolato copper$^{II}$ were suspended in 150 parts methanol and stirred at room temperature. To this were added 6.1 parts monoethanolamine dissolved in 50 parts methanol and stirring continued for 2 hours. The green solid was then filtered off, washed with 500 parts methanol and then dried at 50–55° C. to yield 35 parts of a green solid. The copper content of this material was 17.25% which corresponds to a composition containing 3 molecular proportions of the ethanolamine derivative $$C_{19}H_{18}N_2O_3Cu$$

to one of 2-(2-hydroxylatonaphth-1-ylmethyleneamino) phenolato copper$^{II}$.

EXAMPLE 6

64.9 parts 2(2-hydroxylatonaphth-1-ylmethyleneamino)phenolato copper$^{II}$ were suspended in 1,500 parts methanol and stirred at room temperature. 75 parts N,N'-dicyanoethyloctadecylamine dissolved in 500 parts boiling methanol were then added and stirring was continued for 2 hours. The solid was then filtered off, washed with 1,000 parts methanol and then dried at 55° C. This yielded 114 parts of a green powder which decomposes at 305° C. and consists of a composition containing 2 molecules of the N,N'-dicyanoethyloctadecylamine derivative $C_{41}H_{56}O_2N_4Cu$ and one of 2(2-hydroxylatonaphth-1-ylmethyleneamino)phenolato copper$^{II}$. Found 11.01% copper which is that required by theory.

EXAMPLES 7–15

Further pigments which can be prepared by the method described in Example 6 by replacing the 75 parts of N,N'- dicyanoethyloctadecylamine by an equivalent amount of an appropriate amine, are identified in the following table:

The resulting golden yellow paint films had excellent fastness to light, heat and acids.

| Example | Amine | Approximate molecular ratio* (parent complex: adduct) | Shade when incorporated into an alkyd melamine stoving lacquer | Fastness to light |
|---------|-------|-------------------------------------------------------|----------------------------------------------------------------|-------------------|
| 7 | n-Octadecylamine | 1:6 | Brownish yellow | Excellent. |
| 8 | n-Dodecylamine | 1:3 | Transparent greenish yellow | Do. |
| 9 | n-Docosanylamine | 1:5 | Yellow | Do. |
| 10 | Tetradecyloxy-n-propylamine | 1:4 | Transparent greenish yellow | Do. |
| 11 | Hexadecyloxy-n-propylamine | 1:4 | Dull yellow | Do. |
| 12 | Octadecyloxy-n-propylamine | 1:5 | do | Do. |
| 13 | Di-n-dodecylamine | 1:3 | Brownish yellow | Do. |
| 14 | Ethylene diamine | 1:3 | Yellow | Do. |
| 15 | N'-aminoethylethanolamine | 1:3 | do | Do. |

EXAMPLE 16

100 parts of the product of Example 1, 12.5 parts of the reaction product of formaldehyde and sodium naphthalene β-sulphonate, and 15 parts of the condensation product of 1 mol p-nonylphenol and 7 mols ethylene oxide, were mixed together with 39 parts of water. The pigment was finely dispersed to a particle size of less than $0.5\mu$ by subjecting the mixture to a high shearing force such as is obtained, for example, in a twin-blade kneader of the Werner Pfliederer type, or on a triple roll mill. The resulting dispersion was reduced with water to a pourable paste containing 40% pigment. The product was incorporated by stirring into a water-based polyvinylacetate emulsion paint which was applied to white card to give, on drying, a bright yellow coating with very good fastness to light.

EXAMPLE 17

One part of the product of Example 1 was incorporated into 3 parts of "Uresine B," a commercial carbamate resin, using an automatic muller (4× 50 revolutions at 150 lbs./sq. inch) and 1.2 parts of the resulting paste mixed into 10 parts of the blend of 60 parts "Beckasol 3246" (a coconut glycol alkyd resin of the non-drying type), 30 parts of "Super Beckamine 1517" (a 60% melamine formaldehyde resin solution in xylene/isobutanol) and 10 parts of methoxyethanol. A $100\mu$ film was applied to white card and stoved for 30 minutes at 120° C. giving a bright strong transparent yellow film which was unchanged after exposure for 2000 hours in a "Xenotest" fading lamp. The heatfastness and fastness to cross lacquering were also good.

EXAMPLE 18

Pigmentary rutile titanium dioxide was incorporated into a pigmented lacquer, produced as described in Example 17, in the ratio of 100 parts titanium dioxide to one of 2(2-hydroxylatonaphth-1-ylmethyleneamino)phenolato copper$^{II}$ stearylamine complex. A $100\mu$ film of the resulting laquer was applied to white card and stoved for 30 minutes at 120° C. A bright yellow film resulted which showed a 100% increase in colour value compared with the parent complex.

EXAMPLE 19

60 parts of the product of Example 1 were ball milled with 138 parts of "Epok U9193" which is a solution of an unmodified butylated melamine/formaldehyde resin in n-butanol and 452 parts of xylene. 350 parts of "Epok D2103" which is a solution of a hydroxy acrylic resin in a 1:1 mixture of xylene and n-butanol, were then added gradually and ball milling continued. The resulting mixture had a pigment to binder ratio of 1:5. This was adjusted to 1:10 by the addition of more resin solution and the paint was thinned to the required viscosity for spraying. Suitable articles, for instance, aluminium panels, were sprayed and then stoved at 120° C. for 30 minutes.

EXAMPLE 20

Pigmentary non-leafing aluminium powder was incorporated into a lacquer pigmented with 2-(2-hydroxylatonaphth-1-ylmethyleneamino)phenolato copper$^{II}$ stearylamine pigment as described in Example 19, in the ratio of 1 part metal to 3 of the pigment. The resulting lacquer, after thinning to a suitable viscosity was sprayed onto prepared mild steel panels in the conventional manner. After stoving the panels for 30 minutes at 120° C. an attractive gold metallised finish with very high fastness to weathering was obtained.

EXAMPLE 21

0.15 part of the product of Example 1 was stirred into 500 parts of dimethylformamide until a smooth dispersion was obtained. This dispersion was diluted with 8000 parts of dimethylformamide. To this suspension were added 1500 parts of polyacrylonitrile powder and the mixture stirred at high speed until a smooth dope had been obtained. After deaeration the dope was suitable for the preparation of films and filaments since the pigment was present in a highly dispersed form, no large particles being visible. Films of 20 thousandths of an inch thickness were drawn down on glass and dried immediately at 120° C. for 15 minutes. Bright, strong, transparent yellow films were thus obtained which show excellent fastness to light.

EXAMPLES 22-26

By substituting an equivalent amount of the appropriate azomethine copper complex and an equivalent amount of the appropriate amine for the monoisobutylamine used in Example 1 the compounds shown in the following table may be obtained. The pigments so obtained were incorporated into stoving lacquer as described in Example 17.

The colour in lacquer and a summary of the fastness properties to heat, light and overlacquering are also given in the following table:

| Example | Product | Colour in lacquer | Fastness |
|---------|---------|-------------------|----------|
| 22 | [structure with Cu, HN(CH$_3$)$_2$] | Olive yellow | Excellent. |
| 23 | [structure with Cu, H$_2$N(CH$_2$)$_{17}$CH$_3$] | Yellow | Do. |

| Example | Product | Colour in lacquer | Fastness |
|---|---|---|---|
| 24 | 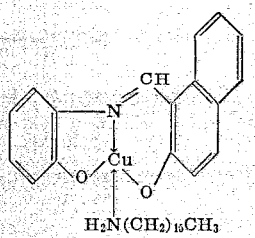 (CH₃)₂N(CH₂)₁₁CH₃ | Olive yellow | Excellent. |
| 25 | 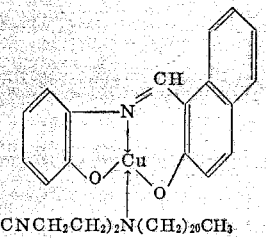 | do | Do. |
| 26 | 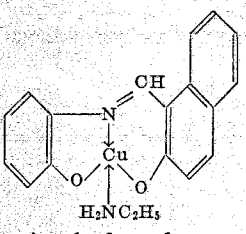 HN(C₁₂H₂₅)₂ | do | Do. |

What we claim is:

1. A pigment having the formula:

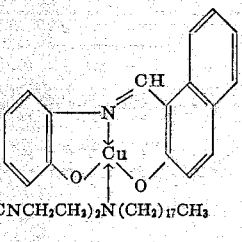 (I)

wherein $R_1$ and $R_2$ are the same or different and each is hydrogen or an alkyl radical having from 1 to 22 carbon atoms and $R_3$ is an alkyl radical having from 1 to 22 carbon atoms, the alkyl radicals in $R_1$, $R_2$ and $R_3$ optionally being terminated by an OH, $NH_2$ or CN group interrupted by an ethylenic or an oxygen-, sulphur- or nitrogen-containing group.

2. A pigment as claimed in claim 1 wherein $R_1$ and $R_2$ are hydrogen and $R_3$ is a straight-chain alkyl residue having from 16 to 22 carbon atoms.

3. A pigment as claimed in claim 1 wherein $R_1$ is an alkyl group having from 1 to 22 carbon atoms and $R_2$ and $R_3$ are each a cyanoethyl group.

4. A pigment having the formula:

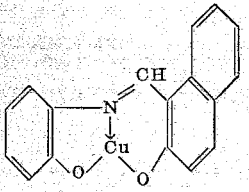 H₂N(CH₂)₁₇CH₃

5. A pigment having the formula:

[structure with H₂N(CH₂)₁₉CH₃]

6. A pigment having the formula:

[structure with (CNCH₂CH₂)₂N(CH₂)₂₀CH₃]

7. A pigment having the formula:

[structure with H₂NC₂H₅]

8. A pigment having the formula:

[structure with (CNCH₂CH₂)₂N(CH₂)₁₇CH₃]

9. A process in which a pigment in claim 1 is produced comprising reacting a compound having the formula:

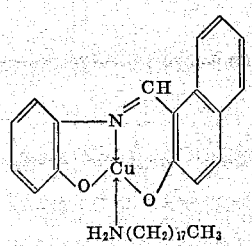

with at least an equimolar amount of an amine of the formula $NR_1R_2R_3$ wherein $R_1$, $R_2$ and $R_3$ are as defined in claim 1.

10. A process as claimed in claim 9 wherein the reaction is effected at an ambient temperature below 60° C.

11. A process as claimed in claim 9 wherein the amine is monoethylamine, ethylene diamine, monoethanolamine, N'-aminoethylethanolamine, tetradecyloxy-n-propylamine, hexadecyloxy - n - propylamine, octadecyloxy-n-propylamine, n-dodecylamine, n-hexadecylamine, n-octadecylamine, commercial stearylamine, n-docosanylamine, di-n-dodecylamine, N,N'-dicyanoethyl octadecylamine or N,N'-dicyanoethyl docosanylamine.

12. A process in which a pigment as defined in claim 1 is produced comprising metallising the hydroxynaphthyl methyleneaminophenol ligand with the corresponding copper amine complex.

References Cited

UNITED STATES PATENTS

| | | | |
|---|---|---|---|
| 2,116,913 | 5/1938 | Schmidt | 260—429 C |
| 3,440,254 | 4/1969 | Lenoir | 260—438.1 X |
| 3,677,782 | 7/1972 | Macpherson et al. | 260—438.1 X |

FOREIGN PATENTS

| | | | |
|---|---|---|---|
| 1,080,115 | 8/1967 | Great Britain | 106—308 N |
| 1,122,938 | 8/1968 | Great Britain | 106—288 Q |
| 1,123,859 | 8/1968 | Great Britain | 106—288 Q |
| 1,297,561 | 5/1962 | France | 260—429 C |

OTHER REFERENCES

Bailar: The Chemistry of the Coordination Compounds, Reinhold Publ. Corp., New York pp. 128–129 (1956).

DANIEL E. WYMAN, Primary Examiner

P. F. SHAVER, Assistant Examiner

U.S. Cl. X.R.

106—288 Q, 308 N; 260—429 C